United States Patent

Suzuki et al.

[11] Patent Number: 5,606,340
[45] Date of Patent: Feb. 25, 1997

[54] THIN FILM TRANSISTOR PROTECTION CIRCUIT

[75] Inventors: Kouji Suzuki; Shuichi Uchikoga; Masami Kakinoki, all of Yokohama, Japan

[73] Assignee: Kabushiki Kaisha Toshiba, Kawasaki, Japan

[21] Appl. No.: 292,287

[22] Filed: Aug. 18, 1994

[30]     Foreign Application Priority Data

Aug. 18, 1993   [JP]   Japan .................. 5-203902

[51] Int. Cl.⁶ ........................................ G09G 3/36
[52] U.S. Cl. ..................... 345/87; 345/92; 257/173; 349/42; 349/50
[58] Field of Search .................. 345/87, 90, 92, 345/93, 904; 359/59, 60; 257/173, 174, 297, 328, 355, 356, 357, 360, 358; 361/56, 91

[56]              References Cited

U.S. PATENT DOCUMENTS

| | | |
|---|---|---|
| 5,068,748 | 11/1991 | Ukai et al. ............................... 359/59 |
| 5,086,365 | 2/1992 | Lien ........................................ 257/356 |
| 5,144,518 | 9/1992 | Miyazaki ................................. 257/328 |
| 5,184,235 | 2/1993 | Sukegawa ................................ 359/60 |
| 5,200,876 | 4/1993 | Takeda et al. ........................... 361/91 |
| 5,208,719 | 5/1993 | Wei ......................................... 257/355 |
| 5,220,443 | 6/1993 | Noguchi .................................. 257/328 |
| 5,270,565 | 12/1993 | Lee et al. ............................... 257/358 |
| 5,373,377 | 12/1994 | Ogawa et al. .......................... 359/59 |

FOREIGN PATENT DOCUMENTS

| | | |
|---|---|---|
| 59-143368 | 8/1984 | Japan . |
| 63-220289 | 9/1988 | Japan . |
| 5-27263 | 2/1993 | Japan . |

*Primary Examiner*—Richard Hjerpe
*Assistant Examiner*—Mahmond Fatahiyar
*Attorney, Agent, or Firm*—Oblon, Spivak, McClelland, Maier & Neustadt, P.C.

[57]           ABSTRACT

A thin film transistor protection circuit includes a outer short-circuit line formed around a pixel electrode driving thin film transistor on an array substrate, and a discharging thin film transistor having a gate electrode and a current path connected between a wiring line connected to the pixel electrode driving thin film transistor and the outer short-circuit line. The protection circuit further includes a charging circuit for charging the gate electrode of the discharging thin film transistor according to a difference in potential between the conductive and wiring lines.

17 Claims, 4 Drawing Sheets

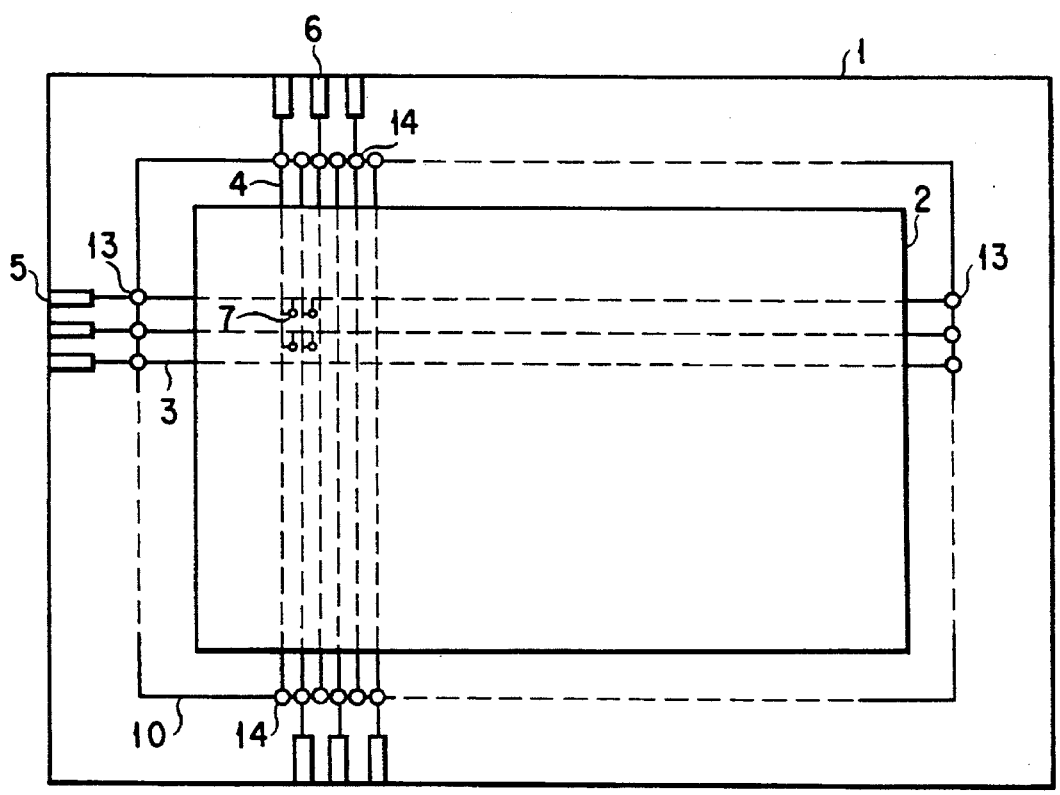
F I G. 2

THIN FILM TRANSISTOR PROTECTION CIRCUIT

BACKGROUND OF THE INVENTION

1. Field of the Invention

The present invention relates to a TFT (thin film transistor) protection circuit and, more specifically, to a TFT protection circuit for protecting a TFT, which drives pixel electrodes arrayed in matrix in a liquid crystal display or the like, from being damaged due to a surge of electrostatic charge.

2. Description of the Related Art

A flat-faced display device such as a liquid crystal display is used widely in the field of personal computers, wordprocessors, and the like. The liquid crystal display has features of being thin, light, and operable at a low voltage, and its constitution can be modified easily for displaying color images. Attention has recently been attracted to an active matrix liquid crystal display. This liquid crystal display is the most suitable for full-color television and office automation apparatuses since it is free from deterioration of contrast, response or the like due to an increase in pixels and capable of halftone display.

As a basic constitution of a generally-used liquid crystal display, the active matrix liquid crystal display includes a pair of substrates having an array substrate and its opposite substrate, and a liquid crystal cell held between these substrates. The array substrate has a transparent glass substrate, a matrix array of pixel electrodes formed on the glass substrate, a plurality of scanning lines formed along the rows of the pixel electrodes, and a plurality of data lines formed along the columns thereof. The opposite substrate has a color filter and a common electrode which are formed on a transparent glass substrate to face the matrix array of pixel electrodes. In particular, the active matrix liquid crystal display is provided with a plurality of TFTs serving as switching elements for selectively driving the pixel electrodes of the array substrate. Each TFT is located near a crossing point of one of the scanning lines and one of the data lines in order to drive one of the pixel electrodes, and includes a gate electrode connected to the one scanning line, a drain connected to the one data line, and a source connected to the one pixel electrode. The gate electrode is formed on the glass substrate, and the source and drain are formed in an a-Si (amorphous silicon) layer which is formed over the gate electrode with a gate insulation film inserted therebetween.

In the liquid crystal display described above, a selection signal is supplied in sequence to every scanning line to turn on a set of TFTs connected to the scanning line concurrently. When the TFTs are turned on, each TFT supplies a pixel data signal received from a corresponding data line to a corresponding pixel electrode. The orientation of liquid crystal is controlled by a difference in potential between the pixel electrode and the common electrode within a pixel region defined by these electrodes. The liquid crystal display therefore displays images whose light intensity distribution varies with the transmittance distribution. This technique is disclosed by T. P. Brody et al. "IEEE Transactions on Electronic Devices", Vol. ED-20, November, 1973, pp. 995–1001.

Since the display characteristic of the foregoing liquid crystal display greatly depends upon the performance of the pixel electrode driving TFTs, the management of a manufacturing process is important in order to keep an electron mobility μn, a threshold voltage vth, and an off current Ioff, which are principal factors for determining the performance of the TFTs, to desired values. However, these TFTs are weak to a surge of electrostatic charge, like MOS transistors of a silicon IC. If a difference in potential between the gate electrode and one of the source and drain is increased by the electrostatic charge produced in a process of forming an array substrate, the insulation properties of the gate insulation film are degraded, with the result that the TFTs cannot be employed.

Conventionally, a TFT protection circuit, as shown in FIG. 1, is formed on an array substrate before formation of electrode driving TFTs. This protection circuit comprises a conductive outer short-circuit line 10 surrounding an array of the driving TFTs on the array substrate, and a plurality of impedance elements 11 connected between the outer short-circuit line 10 and one of wiring lines such as scanning lines 3 and data lines 4. Each of the impedance elements 11 includes two discharging TFTs 11a and 11b of a-Si (amorphous silicon). The current paths of these discharging TFTs 11a and 11b are connected in parallel to each other, the gate electrode of the TFT 11a is connected to the outer short-circuit line 10, and the gate electrode of the TFT 11b is connected to the wiring line 3 or 4. If a difference in potential between the wiring line 3 or 4 and the outer short-circuit line 10 increases, one of the TFTs 11a and 11b is turned on to transfer the electrostatic charge on the wiring line 3 or 4 to the outer short-circuit line 10. A high voltage is thus prevented from being applied to gate insulation films of the driving TFTs. The TFT protection circuit is used throughout processes of forming the array substrate, of forming a liquid crystal cell, and of assembling a module, and then maintained even after the finished product is obtained. For this reason, the driving TFTs can be protected from its breakage due to a surge of electrostatic charge not only during these processes but also after shipping of the finished products.

However, the above-described TFT protection circuit has the following drawback. If the discharging TFTs 11a and 11b are broken by a surge of electrostatic charge, the insulation property of the gate insulation films deteriorates between the gate electrode and one of the source and drain, resulting that the wiring line 3 or 4 is permanently short-circuited with the outer short-circuit line 10. The gate insulation films normally withstand a voltage of about 100 v, and a voltage applied thereto by electrostatic charge often exceeds the withstand voltage. Generally, a liquid crystal display is considered to be defective simply because the above short circuit occurs on one of 1000 or more wiring lines.

Furthermore, it is desirable that the impedance of the discharging TFTs 11a and 11b be as low as possible to such an extent that it cannot influence the driving of pixel electrodes in order to improve in discharge efficiency of electrostatic charge. Therefore, the impedance is practically set to about ten times as high as the output impedance of driver ICs, which are connected to terminal sections 5 and 6 to supply a selection signal and a pixel data signal. Since, however, the discharging TFTs 11a and 11b are constituted of a-Si (amorphous silicon) whose electron mobility is low, they have to occupy a considerably large area on the array substrate. This restricts the shape of the liquid crystal display or intervals of the wiring lines, with the result that a short circuit may easily occur between adjacent wiring lines during their forming process, thereby lowering the yield of the liquid crystal display.

As described above, the conventional liquid crystal display has the drawback wherein a defect in wiring lines is easy to occur owing to electrostatic charge produced in the manufacturing process of the display since sufficient measures are not taken against the electrostatic charge which causes TFT properties to deteriorate. The drawback is not limited to the above liquid crystal display but applied to various types of display device using TFTs as switching elements.

SUMMARY OF THE INVENTION

The object of the present invention is to provide a thin film transistor protection circuit capable of reliably protecting a thin film transistor against being damaged due to a surge of electrostatic charge, while an area occupied by the circuit is reduced.

This object can be attained by a thin film transistor protection circuit which comprises a conductive line formed around a thin film transistor to be protected on a substrate;

a discharging thin film transistor having a gate electrode, and a current path connected between the conductive line and a wiring line connected to the thin film transistor to be protected; and a charging circuit for charging the gate electrode of the discharging thin film transistor according to a difference in potential between the conductive line and the wiring line.

According to the aforementioned thin film transistor protection circuit, when the wiring line is charged by positive or negative electrostatic charge, the charging circuit charges the gate electrode of the discharging thin film transistor interposed between the wiring line and conductive line according to a difference in potential between the wiring and conductive lines. The discharging thin film transistor is turned on when the voltage of the gate electrode exceeds a threshold value, and causes the charges to be removed from the wiring line toward the conductive line.

Since the charging circuit prevents a high voltage of electrostatic charge from being directly applied to the gate electrode of the discharging thin film transistor, the discharging thin film transistor is not broken easily. Even though the gate electrode is connected to one end of the current path at low resistance because of breakage of the discharging thin film transistor, the wiring and conductive lines are not permanently short-circuited with each other. Thus, a voltage signal can be normally supplied from an external driver IC or the like to the thin film transistor to be protected through the wiring line.

Since, furthermore, the charging circuit causes the discharging thin film transistor to be turned on when the potential of the wiring line is higher or lower than that of the conductive line, the number of discharging thin film transistors having a large occupation area can be reduced to one for a single wiring line. Since the charging circuit is used only for charging the gate electrode of the discharging thin film transistor, a large area is not occupied by the charging circuit. Accordingly, the entire thin film transistor protection circuit can be configured more compactly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE INVENTION

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a plan view schematically showing a configuration of a liquid crystal display incorporating a thin film transistor protection circuit according to a first embodiment of the present invention;

DETAILED DESCRIPTION OF THE PREFERRED EMBODIMENT

A thin film transistor protection circuit according to a first embodiment of the present invention will now be described, with reference to the accompanying drawings.

Figure 3:
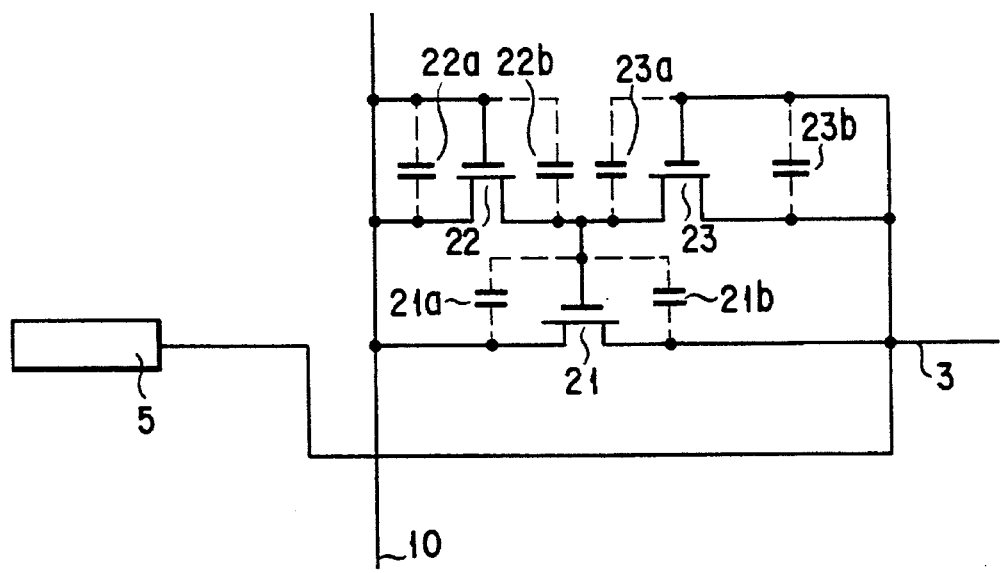
FIG. 3 is a circuit diagram showing a configuration of the thin film transistor protection circuit shown in FIG. 2.

FIG. 2 schematically shows a configuration of a liquid crystal display incorporating the thin film transistor protection circuit, and FIG. 3 shows a configuration of the thin film transistor protection circuit in detail. The liquid crystal display shown in FIG. 2 comprises a pair of substrates having an array substrate 1 and an opposite substrate 2, and a liquid crystal cell held between these substrates 1 and 2. The array substrate 1 includes a matrix array of pixel electrodes formed on a transparent glass substrate, a plurality of scanning lines 3 formed along the rows of the pixel electrodes, and a plurality of data lines 4 formed along the columns thereof. The opposite substrate 2 has a color filter and a common electrode which are formed on a transparent glass substrate to face the matrix array of pixel electrodes. The liquid crystal display also comprises a plurality of thin film transistors (TFTs) 7 serving as switching elements for selectively driving the pixel electrodes of the array substrate. Each of the TFTs 7 is located near a crossing point of one of the scanning lines 3 and one of the data lines 4 in order to drive one of the pixel electrodes, and includes a gate electrode connected to the one scanning line, a drain connected to the one data line, and a source connected to the one pixel electrode. The gate electrode is formed on the glass substrate, and the source and drain are formed in an a-Si (amorphous silicon) layer which is formed over the gate electrode with a gate insulation film inserted therebetween. The scanning lines 3 are connected to terminal sections 5 which are formed along the periphery of the array substrate 1 to receive a selection signal supplied from an external driver IC having an output impedance of 2 kΩ. The data lines are connected to terminal sections 6 which are formed on the periphery of the array substrate 1 to receive a pixel data signal supplied from an external driver IC of 2 KΩ.

The thin film transistor protection circuit is constituted by a conductive outer short-circuit line 10 formed around the pixel electrode driving TFTs 7 on the array substrate 1, a plurality of discharge circuits 13 formed at crossing points between the scanning lines 3 and outer short-circuit line 10, and a plurality of discharge circuits 14 formed at crossing points between the data lines 4 and outer short-circuit line 10.

The discharge circuits 13 and 14 have configurations similar to each other. As shown in FIG. 3, each discharge circuit 13 (or 14) includes a discharging TFT 21 and charging TFTs 22 and 23. The current path of the discharging TFT 21 is connected between the scanning line 3 (or data line 4) and the outer short-circuit line 10, and the gate electrode thereof is connected to the drains of the charging TFTs 22 and 23. Both the gate electrode and source of the charging TFT 22 are connected to the outer short-circuit line 10, and both the gate electrode and source of the charging TFT 23 are connected to the scanning line 3 (or data line 4). On the array substrate 1, all the thin film transistors have a reverse-staggered structure wherein the gate electrode is located at the lowermost position. The discharging TFT 21 has a channel length of 12 µm, and a channel width of 2000 µm. The charging TFTs 22 and 23 has a channel length of 12 µm, and a channel width of 100 µm. The on-resistance of the discharging TFT 21 is about 100KΩ when the gate voltage is 20 V. Since this value is considerably higher than the output impedance (=2 kΩ) of the external driver IC connected to the terminal section 5 (or 6), it does not influence a normal display operation at all. In FIG. 3, reference numerals 21a and 21b indicate parasitic capacitances of the discharging TFT 21, numerals 22a and 22b denote parasitic capacitances of the charging TFT 22, and numerals 22a and 22b denote parasitic capacitances of the charging TFT 23.

The following two types of TFT breakage will occur on the array substrate 1. The first type of TFT breakage is caused by irregular charging due to friction between the array substrate and air moved relatively to the array substrate. The second type of TFT breakage is caused by partial charging due to contact of the array substrate with an external object. In particular, if the array substrate and external object contact each other, a high voltage of electrostatic charge is instantaneously produced on the substrate. Since, in the prior art, the high-voltage is directly applied to the gate electrode of the discharging TFT, the discharging TFT is easy to break. If this breakage occurs, the insulation properties of the gate insulation film are degraded at a point between the gate electrode and one end of the current path, and a short circuit between the outer short-circuit line 10 and scanning line 3 (or data line 4) occurs at this point. As a result, a signal voltage of the driver IC cannot be normally applied to the TFTs 7.

In the TFT protection circuit shown in FIG. 3, however, a voltage of electrostatic charge produced between the scanning line 3 and outer short-circuit line 10 is applied to the parasitic capacitances 22b and 23a of the charging TFTs 22 and 23 and the parasitic capacitances 21a and 21b of the discharging TFT 21. Thus, the voltage across the gate insulation film of the discharging TFT 21 is reduced to half the voltage of electrostatic charge. For example, when the potential of the scanning line 3 is lower than that of the outer short-circuit line 10, the TFT 22 is turned on to charge the gate electrode of the TFT 21 by the potential of the outer short-circuit line 10. The TFT 21 is then turned on to discharge electrostatic charge on the scanning line 3 to the outer short-circuit line 10. During this period, the TFT 23 remains in an off state.

The discharging TFT 21 is operable even though the parasitic capacitance 22b of the charging TFT 22 is broken upon application of electrostatic charge at very high voltage. Since the gate electrode and drain of the charging TFT 22 are electrically connected by a portion of the gate insulation film which is made at a low resistance due to the breakage, the potential of the outer short-circuit line 10 is applied to the gate electrode of the discharging TFT 21 via the low resistance portion. Therefore, the electrostatic charge can be discharged by the discharging TFT 21. On the other hand, when the parasitic capacitance 21b of the discharging TFT 21 is broken upon application of electrostatic charge at very high voltage, the gate electrode and drain of the discharging TFT 21 are electrically connected by a portion of the gate insulation film which is made at a low resistance due to the breakage, and the potential of the wiring line is applied to the gate electrode of the discharging TFT 21 via the low resistance portion. Therefore, the electrostatic charge can be discharged by the charging TFT 22. It has turned out experimentally that the parasitic capacitances 21b and 22b of the two TFTs 21 and 22 are hardly broken concurrently, and the TFT protection circuit shown in FIG. 3 is very resistant to electrostatic charge applied thereto instantaneously.

According to the first embodiment described above, the current path of the discharging TFT 21 is connected between the outer short-circuit line 10 and scanning line 3 (or data line 4), that of the charging TFT 22 is connected between the gate electrode and drain of the discharging TFT 21, and that of the charging TFT 23 is connected between the gate electrode and drain of the discharging TFT 21. This enables the discharging TFT 21 to be turned on when positive or negative charge is produced on the scanning line 3 (or data line 4). Therefore, the pixel electrode driving TFT 7 can be prevented in advance from being damaged.

When a high voltage of electrostatic charge is produced, the gate electrode of the discharging TFT 21 is charged by the charging TFT 22 or 23. Since the high voltage is dividedly applied to the TFTs 21, 22, and 23, concurrent breakage of the TFTs 21 and 22 or the TFTs 21 and 23 would not easily occur as compared with the case where the high voltage is directly applied to each of the TFTs 21, 22, and 23. This reduces the possibility that the scanning line 3 (or data line 4) is permanently short-circuited with the outer short-circuit line 10, and ensures that the voltage signal will be normally supplied to the pixel electrode driving TFT 7 from the terminal section 5 (or 6) connected to the external driver IC.

Figure 1:
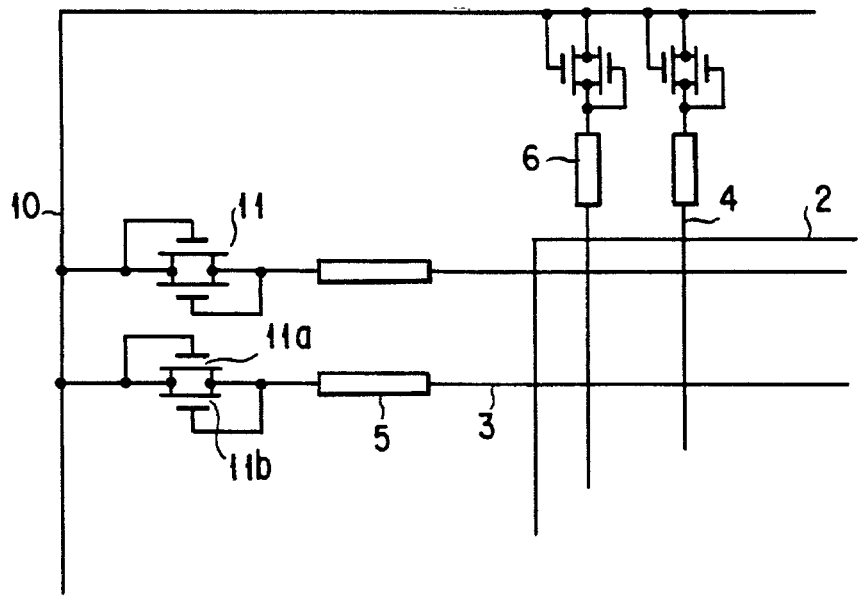
FIG. 1 is a circuit diagram showing a configuration of a conventional thin film transistor protection circuit.

In the TFT protection circuit according to the first embodiment, unlike the prior art shown in FIG. 1, the single discharging TFT 21 is provided for one scanning line 3 or one data line 4, and the charging TFTs 22 and 23 are newly added thereto. In other words, the number of discharging TFTs occupying a larger area can be reduced to half that of the prior art discharging TFTs. Since the charging TFTs 22 and 23 are used to control the discharging TFT 21, the occupation area of the TFTs 22 and 23 is considerably smaller than that of the TFT 21. Thus, even though charging TFTs 22 and 23 are added, the discharge circuits 13 and 14 can be configured more compactly than the prior art discharge circuit. Specifically, the ratio of the occupation area of the two TFTs shown in FIG. 1 to that of the three TFTs 21, 22 and 23 is about 1 to 0.6.

Figure 4:
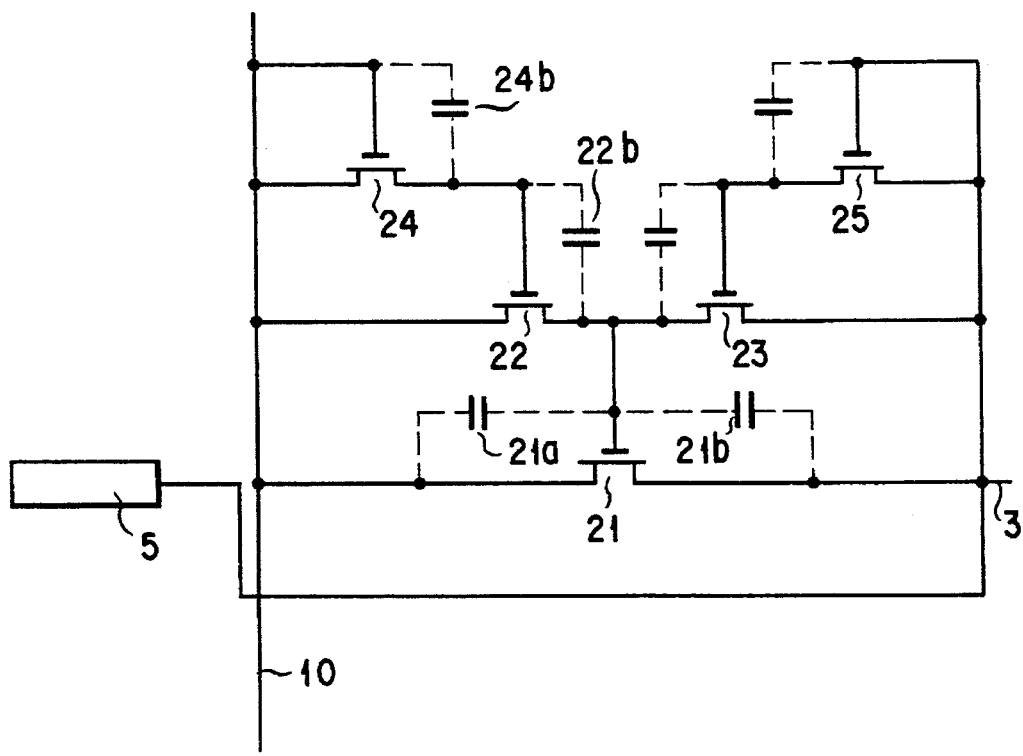
FIG. 4 is a circuit diagram showing a configuration of a thin film transistor protection circuit according to a second embodiment of the present invention.

A thin film transistor protection circuit according to a second embodiment of the present invention will now be described. FIG. 4 shows a configuration of the thin film transistor protection circuit. In FIG. 4, the same components as those in FIG. 3 are indicated by the same reference numerals, and their descriptions are omitted.

In the second embodiment, the discharge circuits 13 and 14 have the same configuration. Each of the discharge circuits includes charging TFTs 24 and 25 added to the circuit shown in FIG. 3. The charging TFT 24 has a current path connected between the gate electrode of the charging TFT 22 and the outer short-circuit line 10, and a gate electrode connected to the outer short-circuit line 10. The charging TFT 25 has a current path connected between the gate electrode of the charging TFT 23 and the scanning line 3 (or data line 4), and a gate electrode connected to the scanning line 3 (or data line 4).

Assuming that a high voltage of positive electrostatic charge is produced on the scanning line, the TFT 25 is turned on to apply a positive high voltage to the gate electrode of the TFT 23. Thus, the TFT 23 is turned on to apply a positive high voltage to the gate electrode of the TFT 21. The TFT 21 is thus turned on so that the positive electrostatic charge on the scanning line 3 can be discharged to the outer short-circuit line 10. On the other hand, assuming that a high voltage of negative electrostatic charge is produced on the scanning line 3, the charging TFTs 22 and 24 are turned on, and the discharging TFT 21 is also turned on, so that the negative electrostatic charge on the scanning line 3 to the outer short-circuit line 10.

Since the voltage of the electrostatic charge is divided by the three TFTs 21, 22 and 24 or TFTs 21, 23 and 25 in the second embodiment, the voltage across the gate insulation film of each TFT is lower than that in the first embodiment shown in FIG. 3. This greatly reduces the possibility that these TFTs are concurrently broken. The second embodiment has the advantage wherein, even though one of the three TFTs is broken, the remaining two TFTs maintain a discharge effect with respect to electrostatic charge produced during the subsequent manufacturing process and reliably protect the pixel electrode driving TFT 7.

Figure 5:
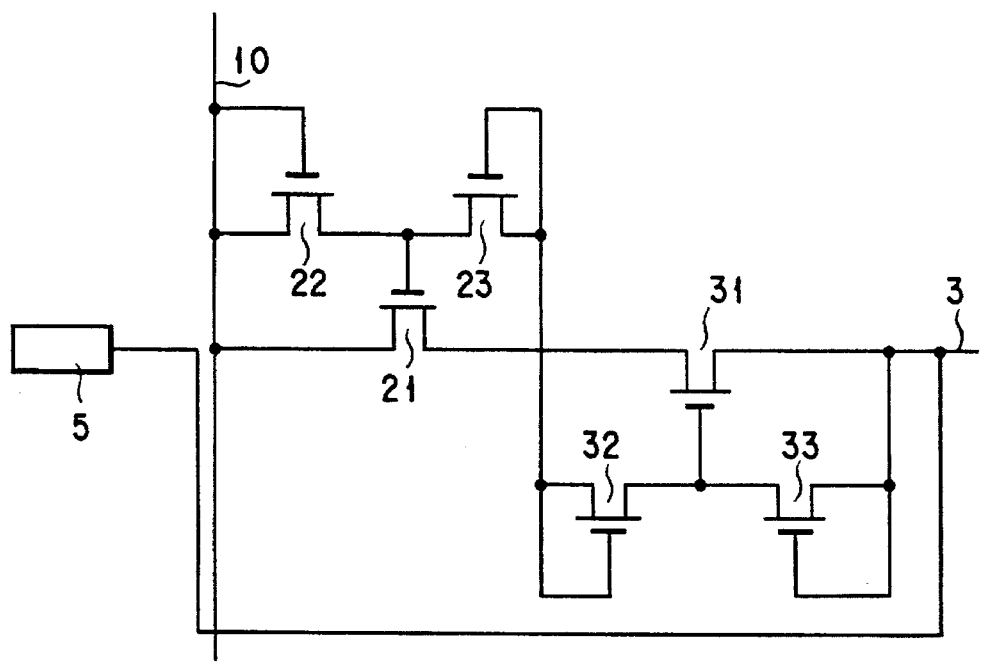
FIG. 5 is a circuit diagram showing a configuration of a thin film transistor protection circuit according to a third embodiment of the present invention.

A thin film transistor protection circuit according to a third embodiment of the present invention will now be described. FIG. 5 shows a configuration of the thin film transistor protection circuit. In FIG. 5, the same components as those in FIG. 3 are indicated by the same reference numerals, and their descriptions are omitted.

In the third embodiment, two discharge circuits having the same configuration as shown in FIG. 3 are connected in series between the outer short-circuit line 10 and the scanning line 3 (or data line 4). One of the discharge circuits includes discharging TFT 21 and charging TFTs 22 and 23, and the other includes discharging TFT 31 and charging TFTs 32 and 33. The first embodiment shown in FIG. 3 cannot cope with the case where the source and drain electrodes of discharging TFT 21 are formed in contact with each other due to a mask alignment error or the like caused in a patterning process. Since, in this case, the scanning line 3 (or data line 4) and outer short-circuit line 10 are permanently short-circuited with each other by the discharging TFT 21, a signal voltage cannot be normally applied from the driver IC to the pixel electrode driving TFT 7. The reason why the two discharge circuit are provided in the third embodiment is that, even if the source and drain electrodes are formed in contact with each other at one of the discharging TFTs 21 and 31, the other TFT allows the scanning line 3 (or data line 4) to be electrically disconnected from the outer short-circuit line 10.

Figure 6:
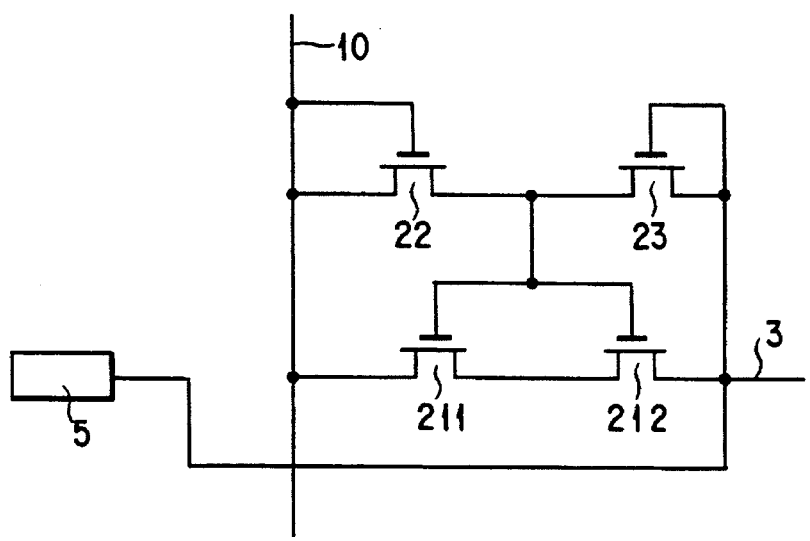
FIG. 6 is a circuit diagram showing a configuration of a thin film transistor protection circuit according to a fourth embodiment of the present invention.

A thin film transistor protection circuit according to a fourth embodiment of the present invention will now be described. FIG. 6 shows a configuration of the thin film transistor protection circuit. In FIG. 6, the same components as those in FIG. 3 are indicated by the same reference numerals, and their descriptions are omitted.

In the fourth embodiment, discharging TFTs 211 and 212, having the same configuration as that of the discharging TFT 21 shown in FIG. 3, are connected in series between the outer short-circuit line 10 and scanning line 3 (or data line 4). Even in this connection, the same advantage as that of the third embodiment can be obtained. More specifically, even though the source and drain electrodes are formed in contact with each other at one of the discharging TFTs 211 and 212, the other TFT allows the scanning line 3 (or data line 4) to be electrically disconnected from the outer short-circuit line 10.

Figure 7:
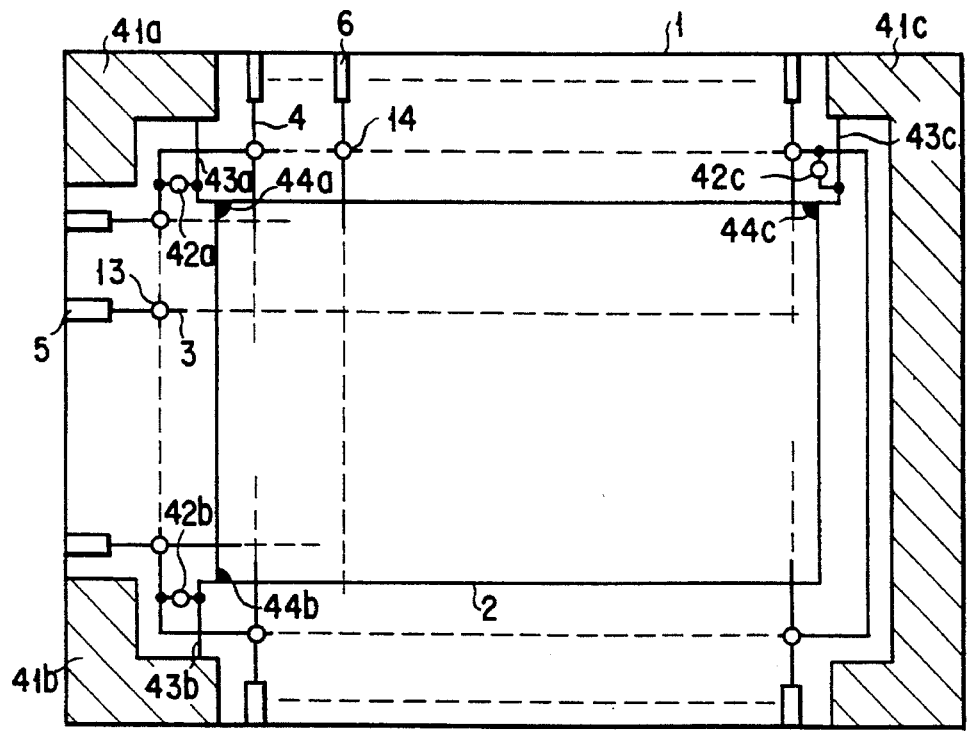
FIG. 7 is a plan view schematically showing a configuration of a liquid crystal display incorporating a thin film transistor protection circuit according to a fifth embodiment of the present invention.

FIG. 7 shows a configuration of a liquid crystal display incorporating a thin film transistor protection circuit according to a fifth embodiment of the present invention. In FIG. 7, the same components as those in FIG. 2 are denoted by the same reference numerals, and their descriptions are omitted. In the liquid crystal display shown in FIG. 7, the opposite substrate 2 includes terminal sections 44a to 44c connected to the common electrode, and the array substrate 1 includes electrode regions 41a to 41c which are formed outside the outer short-circuit line 10 and are to be touched at first in handling during the manufacturing process of the liquid crystal display. The electrode regions 41a to 41c are respectively connected through connection lines 43a to 43c to the terminal sections 44a to 44c to set the potential of the common electrode.

The thin film transistor protection circuit of the fifth embodiment comprises discharging circuits 13 and 14 and outer short-circuit line 10 in the same manner as the first embodiment does, and further comprises discharge circuits 42a to 42c. These discharge circuits 42a to 42c have the same configuration as that of the discharge circuits 13 and 14, and are connected between the outer short-circuit line 10 and connection line 43a, between the line 10 and connection line 43b, and between the line 10 and connection line 43c, respectively.

The voltage of electrostatic charge increases when the liquid crystal display is picked up from a ground position. The discharge circuits 42a to 42c discharge the electrostatic charge toward the opposite substrate 2 having a large capacity, thereby preventing the characteristics of the pixel electrode driving TFTs connected to the scanning lines 3 and data lines 4 on the array substrate 1 from deteriorating.

Figure 8:
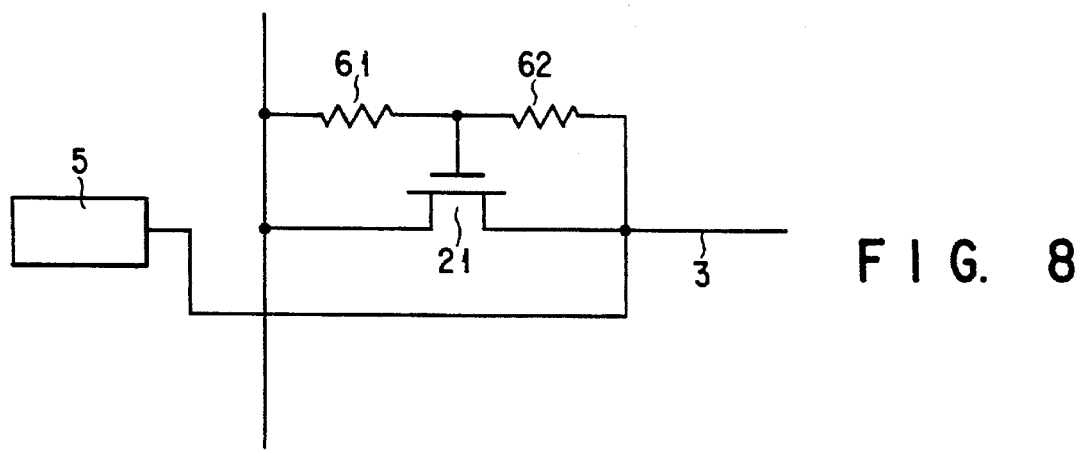
FIG. 8 is a circuit diagram showing a modification of the thin film transistor protection circuit shown in FIG. 3.
Figure 9:
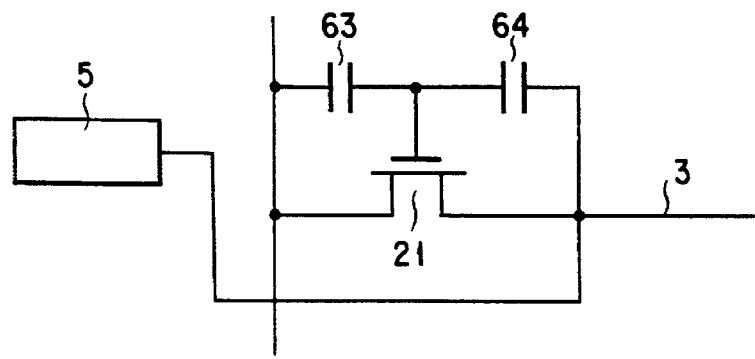
FIG. 9 is a circuit diagram showing another modification of the thin film transistor protection circuit shown in FIG. 3.

The present invention is not limited to the above embodiments. For example, the charging TFTs 22 and 23 can be replaced with resistive elements 61 and 62 shown in FIG. 8 or capacitive elements 63 and 64 shown in FIG. 9, in order to control the potential of the gate electrode of the discharging TFT 21. It is desirable that the resistance of each of the resistive elements 61 and 62 be set to about ten times as high as the on-resistance of the discharging TFT 21 and that the capacitance of each of the capacitive elements 63 and 64 be set to about 1/10 times as large as the parasitic capacitances of the discharging TFT 21.

The charging TFTs 22 and 23, resistive elements 61 and 62, and capacitive elements 63 and 64 can sufficiently fulfill the aforementioned functions even though each is 1/10 or less times as small as the discharging TFT 21. Therefore, by combining these impedance elements with the single discharging TFT 21, it is possible to obtain a discharge circuit having an excellent discharge performance while a restricted space is effectively used.

In the embodiment shown in FIG. 4, the charging TFTs 24 and 25 can be replaced with resistive elements or capacitive elements. In addition, to prevent the liquid crystal display from malfunctioning when the pixel electrodes are driven, the resistance of each discharging TFT 21 has to be set to 10 or more times as high as the output resistance of the driver IC for generating a selection signal (or a pixel data signal).

In the foregoing embodiments, the outer short-circuit line 10 is formed on that region of the array substrate 1 which is not covered by the opposite substrate 2. However, it can be formed on that region of the array substrate which is covered by the opposite substrate 2. If, by doing so, the substantial circuit portion is not directly exposed to open air, the reliability of the TFT protection circuit can be improved more greatly.

The present invention is applied to the liquid crystal display. However, it can be applied to various types of display device using TFTs as switching elements of pixel electrodes and connected to scanning and data lines. Furthermore, various changes and modifications can be made without departing from the scope of the subject matter of the invention.

As has been described, according to the present invention, the scanning and data lines 3 and 4 are electrically connected to the outer short-circuit line 10 by the discharge circuits 13 and 14 using the TFTs. Therefore, the electrostatic charge produced during the manufacturing process can be discharged to prevent the characteristics of the switching TFTs from deteriorating. Further, a single discharging TFT is provided for one discharge circuit in the thin film transistor protection circuit, a lower discharge resistance and a smaller occupation area can easily obtained as compared with the conventional discharge circuit having a plurality of discharging TFTs. Consequently, efficiency in discharging the electrostatic charge can be improved in each discharge circuit.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A thin film transistor protection circuit comprising:
   a conductive line formed around a thin film transistor to be protected on a substrate;
   a discharging thin film transistor having a gate electrode, and a current path connected between said conductive line and a wiring line connected to the thin film transistor to be protected; and
   charging means for charging the gate electrode of said discharging thin film transistor according to a difference in potential between said conductive line and said wiring line,
   wherein said charging means includes a first charging thin film transistor having a current path connected between said conductive line and the gate electrode of said discharging element thin film transistor and a gate electrode connected to said conducting line, and a second charging thin film transistor having a current path connected between said wiring line and the gate electrode of said discharging thin film transistor and a gate electrode connected to said wiring line.

2. A protection circuit according to claim 1, wherein said charging means further includes a third charging thin film transistor having a current path connected between said conductive line and the gate electrode of said first charging thin film transistor and a gate electrode connected to said conductive line, and a fourth charging thin film transistor having a current path connected between said wiring line and the gate electrode of said second charging thin film transistor and a gate electrode connected to said wiring line.

3. A thin film transistor protection circuit comprising:
   a conductive line formed around a thin film transistor to be protected on a substrate;
   a discharging thin film transistor having a gate electrode, and a current path connected between said conductive line and a wiring line connected to the thin film transistor to be protected;
   charging means for charging the gate electrode of said discharging thin film transistor according to a difference in potential between said conductive line and said wiring line; and
   a discharging thin film transistor having a current path connected in series with the current path of said discharging thin film transistor between said conductive line and said wiring line, and a gate electrode charged by said charging means.

4. A thin film transistor protection circuit comprising:
   a conductive line formed around a thin film transistor to be protected on a substrate;
   a discharging thin film transistor having a gate electrode, and a current path connected between said conductive line and a wiring line connected to the thin film transistor to be protected; and
   charging means for charging the gate electrode of said discharging thin film transistor according to a difference in potential between said conductive line and said wiring line,
   wherein said charging means includes a first impedance element connected between the gate electrode of said discharging thin film transistor and said conductive line, and a second impedance element connected between said wiring line and the gate electrode of said discharging thin film transistor.

5. A protection circuit according to claim 4, wherein said first and second impedance elements are resistive elements.

6. A protection circuit according to claim 4, wherein said first and second impedance elements are capacitive elements.

7. A display device comprising:
   an array substrate;
   an opposite substrate; and
   a liquid crystal cell held between said array and opposite substrates; wherein
   said opposite substrate includes a common electrode faced to said array of pixel electrode; and
   said array substrate includes:
   a matrix of pixel electrodes,
   first terminals each for receiving a selection signal;
   second terminals each for receiving a pixel data signal;
   first wiring lines formed along the rows of said pixel electrodes and connected to said first terminals;
   second wiring lines formed along the columns of said pixel electrodes and connected to the second terminals;

driving thin film transistors each formed adjacent to a crossing point between one of said first wiring lines and one of said second wiring lines and having a gate electrode connected to said one first wiring line and a current path connected between said one second wiring line and one of said pixel electrodes;

a conductive line formed around said plurality of driving thin film transistors; and a plurality of discharge means connected to at least one set of said first wiring lines and said second wiring lines, each for discharging electrostatic charge on one wiring line to said conductive line; each discharge means includes:

a discharging thin film transistor having a current path connected between said conductive line and said one wiring line;

a first impedance circuit connected between said conductive line and the gate electrode of said discharging thin film transistor; and a second impedance circuit connected between the gate electrode of said discharging thin film transistor and said one wiring line.

8. A display device according to claim 7, wherein said first impedance circuit includes a charging thin film transistor having a gate electrode connected to said conductive line and a current path connected between said conductive line and the gate electrode of said discharging thin film transistor, and said second impedance circuit includes a charging thin film transistor having a gate electrode connected to said one wiring line and a current path connected between the gate electrode of said discharging thin film transistor and said one wiring line.

9. A display device according to claim 8, wherein said first impedance circuit further includes an impedance element connected between said conductive line and the gate electrode of said charging thin film transistor thereof, and said second impedance circuit further includes an impedance element connected between the gate electrode of said charging thin film transistor thereof and said one wiring line.

10. A display device according to claim 7, wherein said first impedance circuit includes a resistive element connected between said conductive line and the gate electrode of said discharging thin film transistor, and said second impedance circuit includes a resistive element connected between the gate electrode of said discharging thin film transistor and said one wiring line.

11. A display device according to claim 7, wherein said first impedance circuit includes a capacitive element connected between said conductive line and the gate electrode of said discharging thin film transistor, and said second impedance circuit includes a capacitive element connected between the gate electrode of said discharging thin film transistor and said one wiring line.

12. A display device according to claim 7, wherein said conductive line extends along the periphery of said array substrate.

13. A display device according to claim 7, wherein said array substrate further includes second discharge means connected to said conductive line, for discharging electrostatic charge on said conductive line to another conductive line connected to the common electrode of said opposite substrate.

14. A display device comprising:

an array substrate;

an opposite substrate; and a liquid crystal cell held between said array and opposite substrates; wherein said opposite substrate includes a common electrode faced to said array of pixel electrode; and said array substrate includes:

a matrix of pixel electrodes, first terminals each for receiving a selection signal;

second terminals each for receiving a pixel data signal;

first wiring lines formed along the rows of said pixel electrodes and connected to said first terminals;

second wiring lines formed along the columns of said pixel electrodes and connected to said second terminals;

driving thin film transistors each formed adjacent to a crossing point between one of said first wiring lines and one of said second wiring lines and having a gate electrode connected to said one first wiring line and a current path connected between said one second wiring line and one of said pixel electrodes;

a conductive line formed around said plurality of driving thin film transistors; and a plurality of discharge means connected to at least one set of said first wiring lines and said second wiring lines, each for discharging electrostatic charge on one wiring line to said conductive line; each discharge means includes:

a first discharging thin film transistor having a gate electrode, and a current path connected at one end to said conductive line;

a first impedance circuit connected between said conductive line and the gate electrode of said first discharging thin film transistor;

a second impedance circuit connected between the gate electrode and the other end of current path of said discharging thin film transistor;

a second discharging thin film transistor having a gate electrode, and a current path connected between the other end of the current path of said first discharging thin film transistor and said one wiring line;

a third impedance circuit connected between the gate electrode of said second discharging thin film transistor and the other end of the current path of said first discharging thin film transistor; and a fourth impedance circuit connected between the gate electrode of said second discharging thin film transistor and said one wiring line.

15. A display device according to claim 14, wherein said conductive line extends along the periphery of said array substrate.

16. A display device comprising:

an array substrate;

an opposite substrate; and a liquid crystal cell held between said array and opposite substrates; wherein said opposite substrate includes a common electrode faced to said array of pixel electrode; and said array substrate includes:

a matrix of pixel electrodes, first terminals each for receiving a selection signal;

second terminals each for receiving a pixel data signal;

first wiring lines formed along the rows of said pixel electrodes and connected to said first terminals;

second wiring lines formed along the columns of said pixel electrodes and connected to said second terminals;

driving thin film transistors each formed adjacent to a crossing point between one of said first wiring lines and one of said second wiring lines and having a gate electrode connected to said one first wiring line and a current path connected between said one second wiring line and one of said pixel electrodes;

a conductive line formed around said plurality of driving thin film transistors; and a plurality of discharge means connected to at least one set of said first wiring lines and said second wiring lines, each for discharging electrostatic charge on one wiring line to said conductive line; each discharge means includes:

a first discharging thin film transistor having a gate electrode, and a current path connected at one end to said conductive line;

a second discharging thin film transistor having a gate electrode, and a current path connected between the other end of the current path of the first discharging thin film transistor and said one wiring line;

a first impedance circuit connected between said conductive line and the gate electrodes of said first and second discharging thin film transistors; and a second impedance circuit connected between said one wiring line and the gates electrode of said first and second discharging thin film transistors.

17. A display device according to claim 16, wherein said conductive line extends along the periphery of said array substrate.

* * * * *